A. SMITH.
SAFETY MAIL BOX AND DISCHARGE MEANS THEREFOR.
APPLICATION FILED JULY 19, 1916.

1,256,177. Patented Feb. 12, 1918.
7 SHEETS—SHEET 1.

Inventor
A. Smith

By A. W. Wilson
Attorney

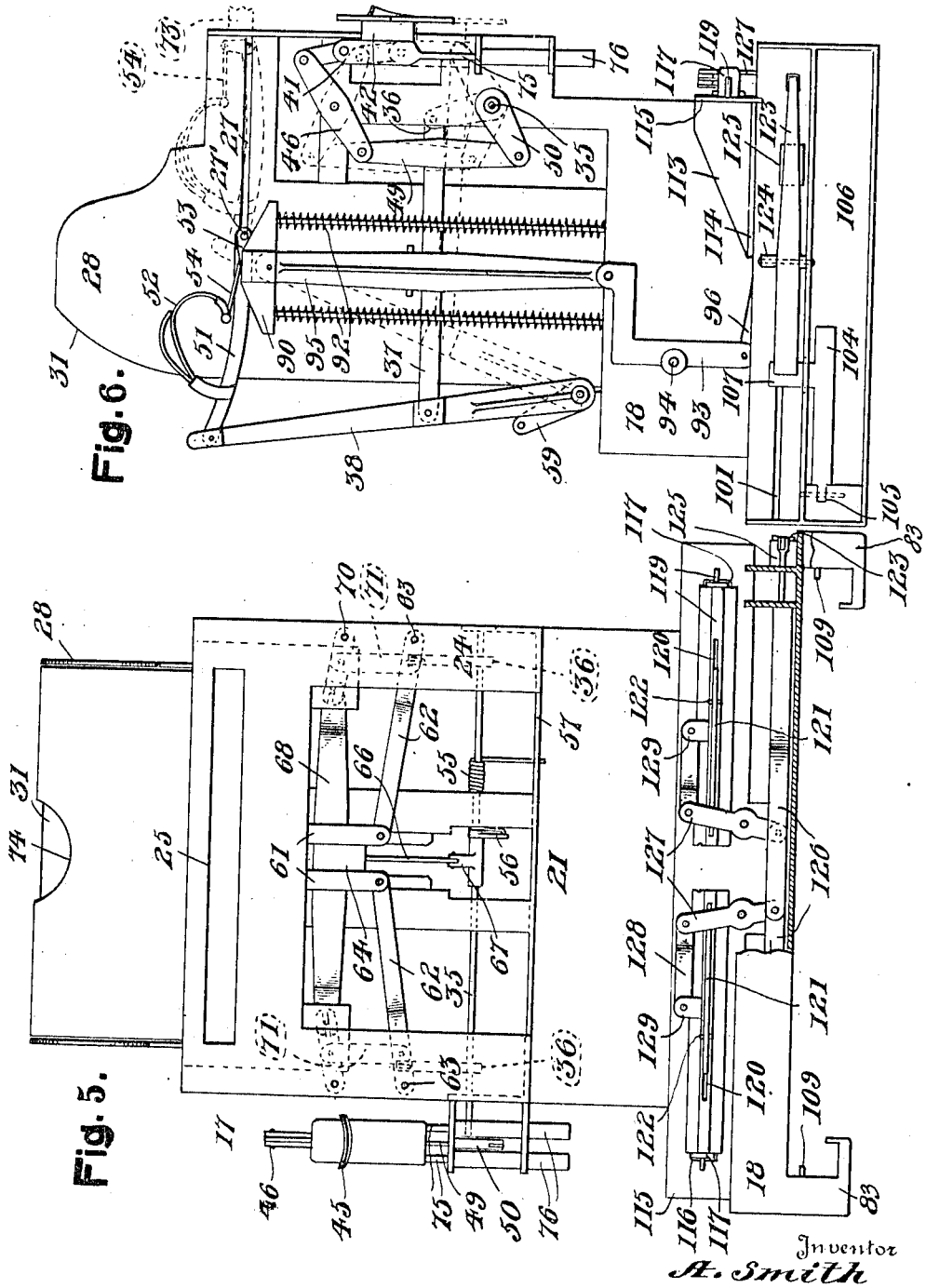

A. SMITH.
SAFETY MAIL BOX AND DISCHARGE MEANS THEREFOR.
APPLICATION FILED JULY 19, 1916.
1,256,177.
Patented Feb. 12, 1918.
7 SHEETS—SHEET 3.
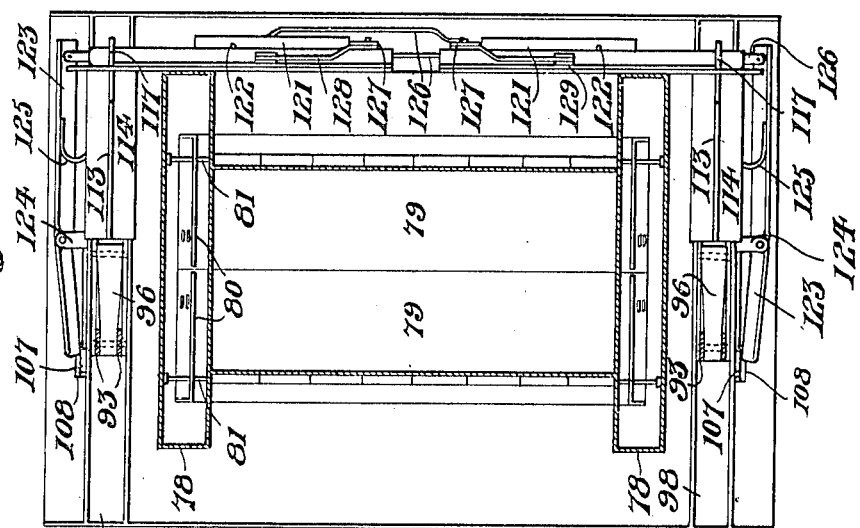
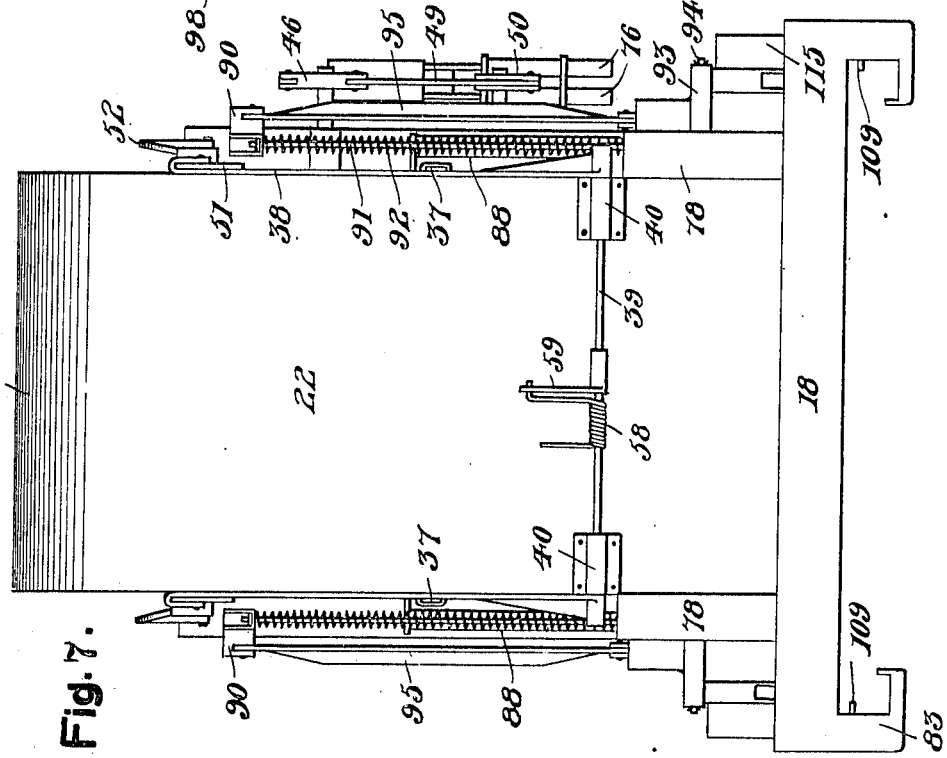

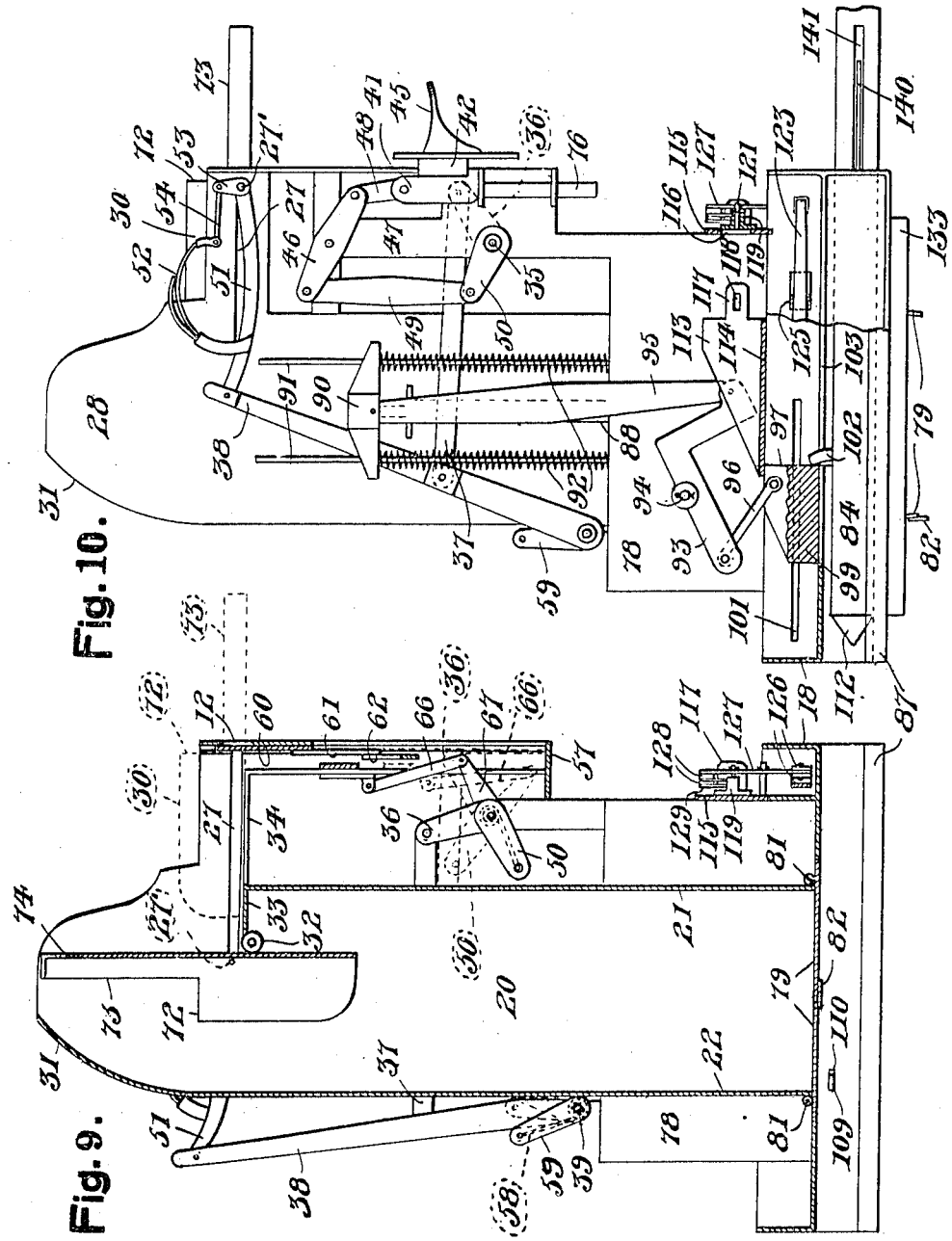

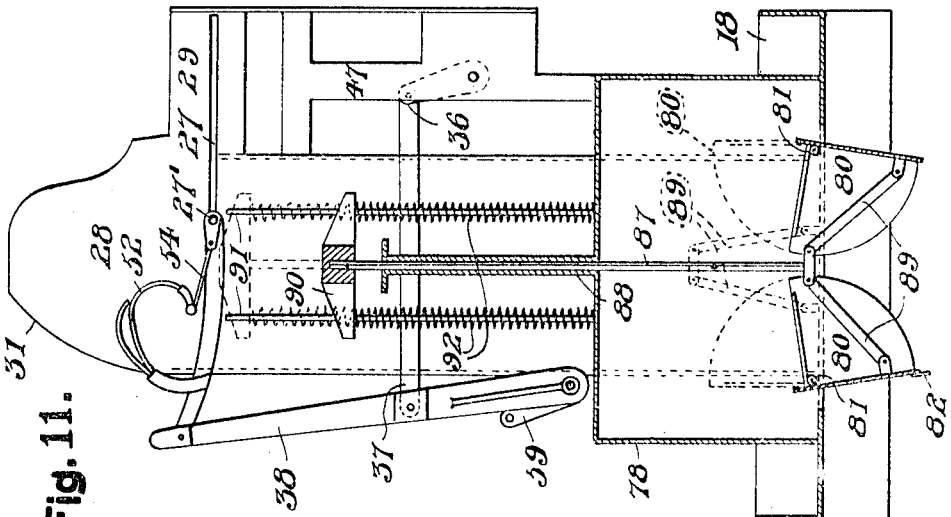

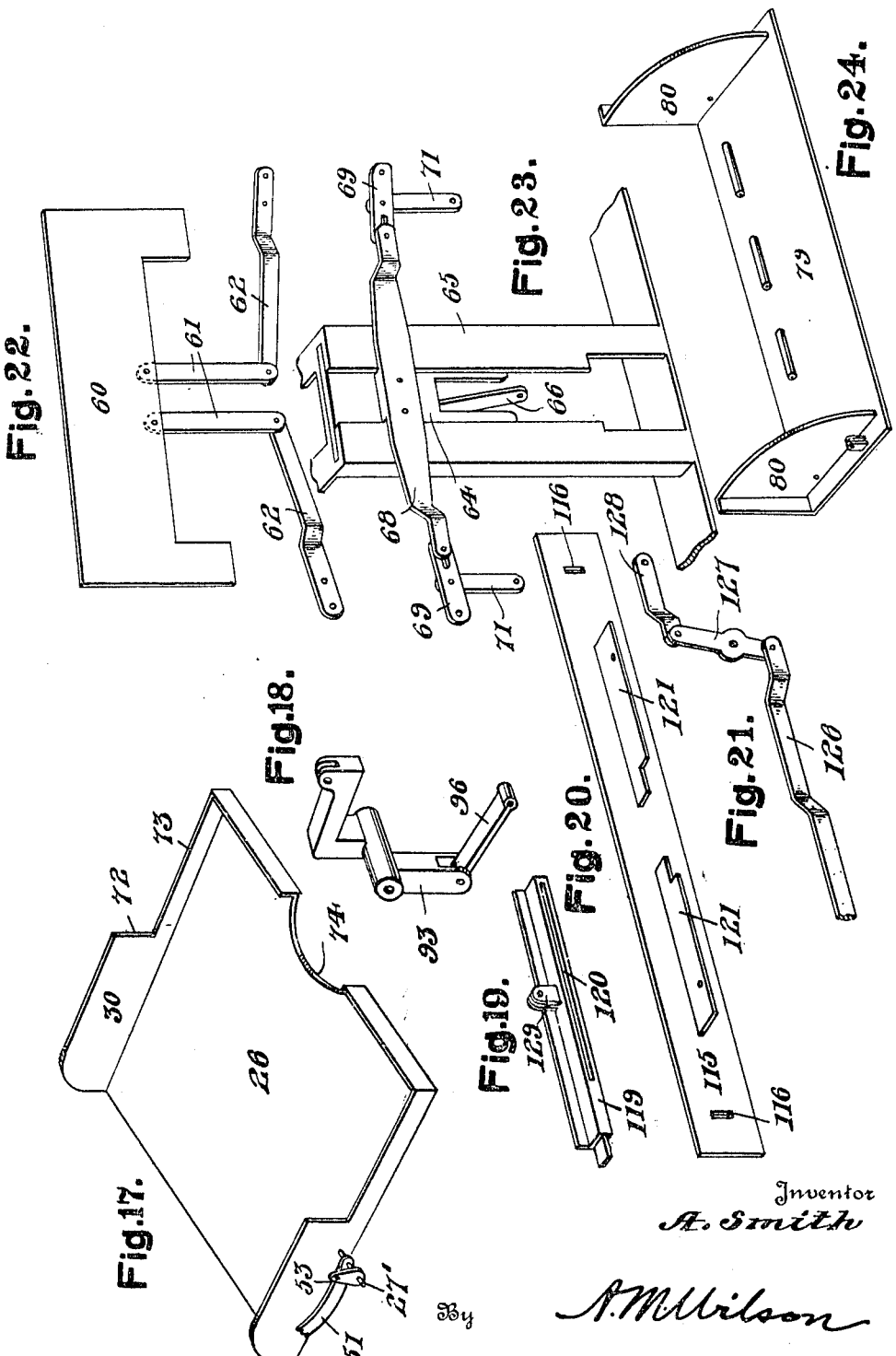

A. SMITH.
SAFETY MAIL BOX AND DISCHARGE MEANS THEREFOR.
APPLICATION FILED JULY 19, 1916.
1,256,177.
Patented Feb. 12, 1918.
7 SHEETS—SHEET 7.
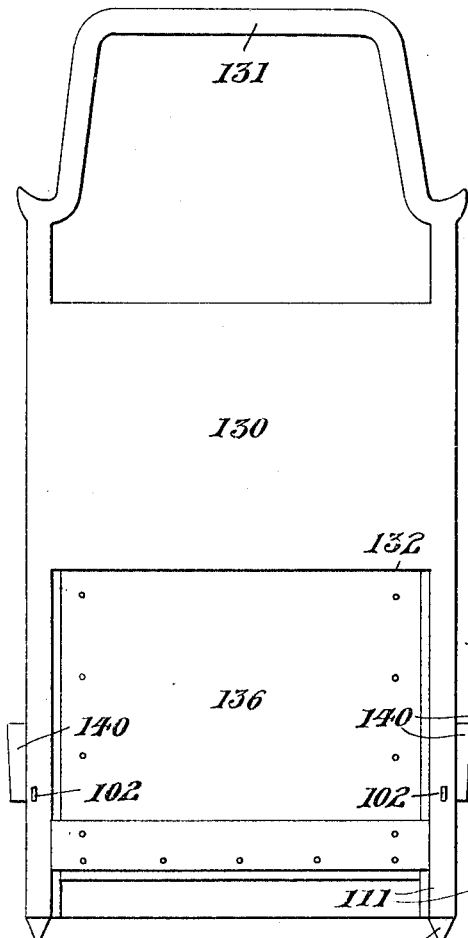
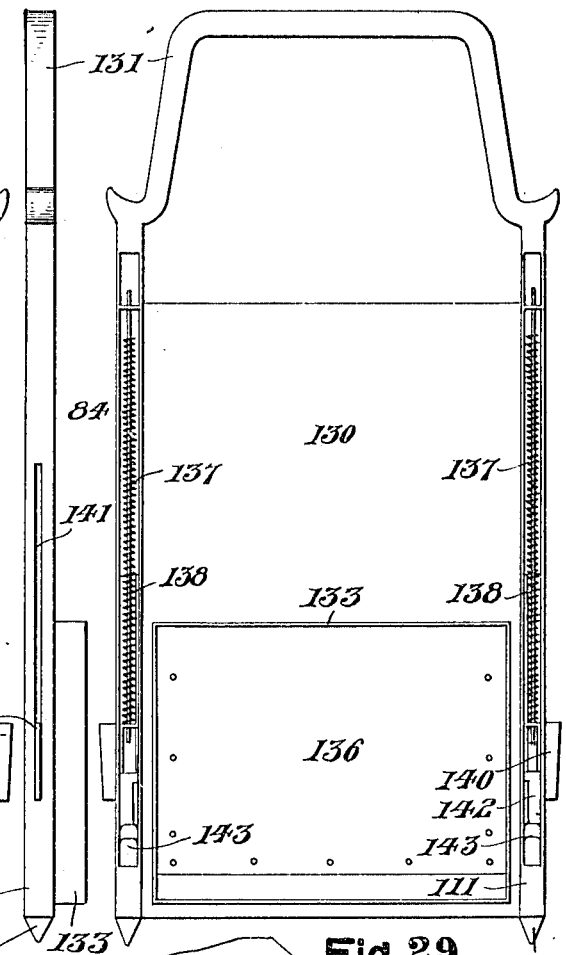
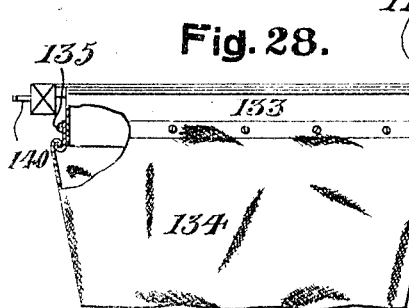
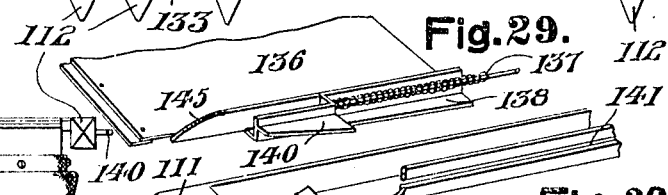
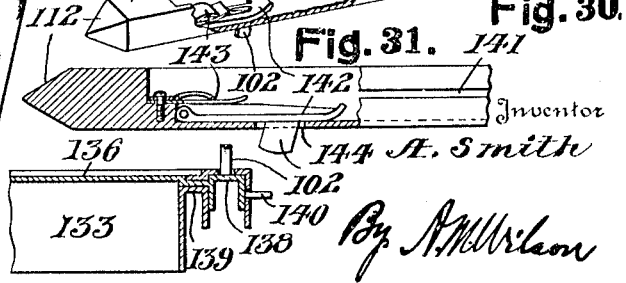
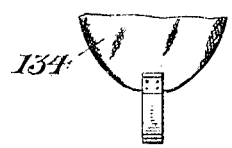

UNITED STATES PATENT OFFICE.

ANDY SMITH, OF WADSWORTH, OHIO.

SAFETY MAIL-BOX AND DISCHARGE MEANS THEREFOR.

1,256,177.

Specification of Letters Patent.

Patented Feb. 12, 1918.

Application filed July 19, 1916. Serial No. 110,116.

*To all whom it may concern:*

Be it known that I, ANDY SMITH, a subject of the King of Hungary, residing at Wadsworth, in the county of Medina and State of Ohio, have invented certain new and useful Improvements in Safety Mail-Boxes and Discharge Means Therefor, of which the following is a specification.

This invention relates to certain new and useful improvements in safety mail boxes and discharge means therefor.

The primary object of the invention is the provision of a mail box provided with a mechanically operated transfer means for depositing mail matter within the receiving receptacle of the box whereby the extraction thereof through the entering passage is rendered impossible.

A further object of the device is the provision of a mail box having a receptacle considerably removed from the entrance slot for the mail matter, manually operated conveying means being arranged between the said slot and receptacle, the said conveying means being normally inactive and at all times preventing all access by means of the hand or any instrument designed for the unauthorized removal of articles from the receptacle.

A still further object of the invention is the provision of a mail box having a safety entrance mechanism for the mail matter and arranged with a dumping device for the mail receptacle easily operable only by an authorized official having a mechanism actuating member arranged therefor.

The present invention also contemplates the provision of a mail box having a receptacle provided with a normally locked bottom closure adapted to be automatically released upon the proper positioning of a mail sack supporting member whereby the contents of the receptacle is deposited within the sack upon the insertion of such member, the closure automatically returning to its closed position upon the withdrawal of such member.

The invention further contemplates a mail box having a receptacle arranged with a bottom outlet normally inclosed arrangement provided with a locking device having a slidable mail pouch supporting releasing means whereby the receptacle bottom is retracted and the mail automatically deposited in the pouch upon the insertion of the said releasing means while upon the removal of the latter, the receptacle bottom automatically closes to its normal locked arrangement.

In the drawings forming a part of this application and in which like designating characters refer to corresponding parts throughout the several views:—

Fig. 5 is a front elevation of the mail receptacle and mechanism removed from the casing and partially broken away.

Fig. 6 is an end elevation of the same.

Fig. 7 is a rear elevation of the elements illustrated in Fig. 5.

Fig. 8 is a horizontal sectional view thereof.

Fig. 9 is a vertical central sectional view of the same.

Fig. 10 is a view similar to Fig. 6 with the mail receiving slide projected.

Fig. 11 is a vertical sectional view taken through a side portion of the members illustrated in Fig. 6 with the bottom of the receptacle outlet in its open position.

Fig. 12 is a detail view partly in section taken adjacent one side of the mechanism of the device.

Fig. 13 is a perspective view of a portion of the base provided for the mechanism.

Fig. 14 is a perspective view of one of the keeper slides of the locking mechanism.

Fig. 15 is a perspective view of a portion of the releasing mechanism.

Fig. 16 is a perspective view of one of the releasing latches employed.

Fig. 17 is a perspective view of the receiving slide for the mail matter.

Fig. 18 is a perspective view of one of the rocker levers and links of the closure opener.

Fig. 19 is a perspective view of one of the slide bolts.

Fig. 20 is a perspective view of the supporting plate for the slide bolts.

Fig. 21 is a perspective view of the operating connections for the slide bolts.

Fig. 22 is a perspective view of the closure slide for the mail entrance slot with its operating levers.

Fig. 23 is a perspective view of the operating means and guide for the closure slide.

Fig. 24 is a perspective view of one of the hinged closure members forming the receptacle bottom.

Fig. 25 is a top plan view of the mail extractor provided with the present form of mail box.

Fig. 26 is a side elevation thereof.

Fig. 27 is a bottom plan view of the same.

Fig. 28 is an end view of the extractor with the mail pouch operatively suspended therefrom, the mail pouch being broken away.

Fig. 29 is a perspective view of a portion of the closure of the extractor and the adjacent mechanism.

Fig. 30 is a perspective view of a portion of the operative end of one of the side bars of the extractor.

Fig. 31 is a side elevation thereof partly in longitudinal section, and,

Fig. 32 is a transverse sectional view through a side portion of the extractor.

Figure 1:
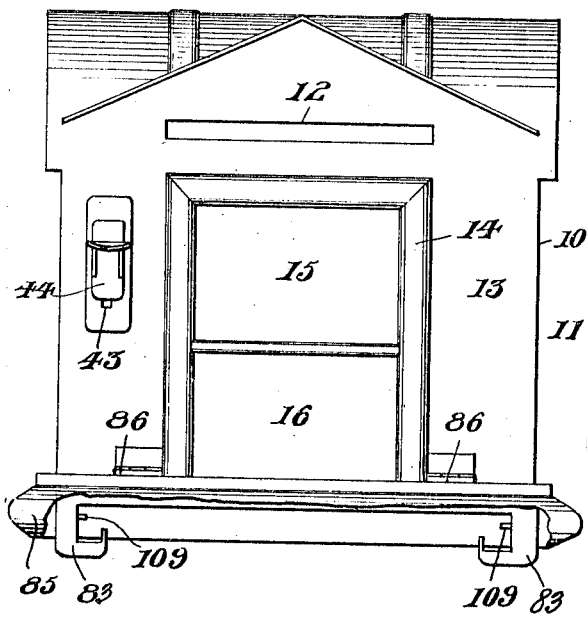
Figure 1 is a front elevation of the device partially broken away.
Figure 3:
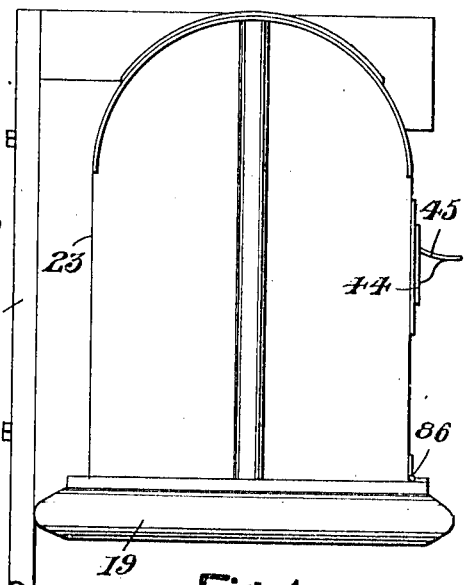
Fig. 3 is an end elevation of the same.
Figure 2:
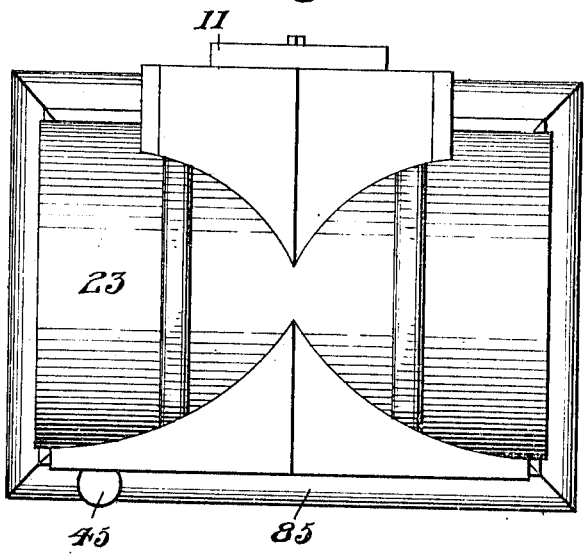
Fig. 2 is a top plan view thereof.
Figure 4:
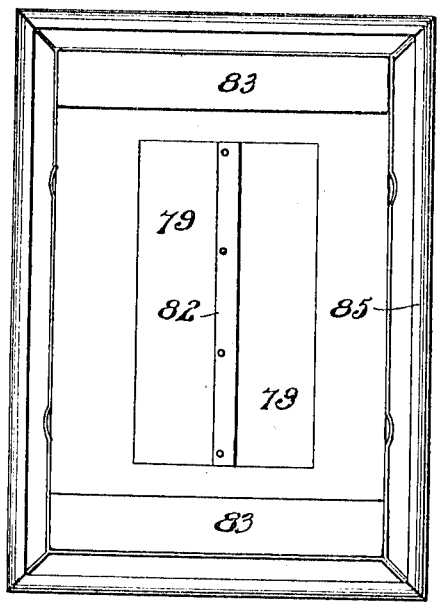
Fig. 4 is a bottom plan view thereof.

It will be first understood that while the present invention is directed to mail collection boxes, the same more specifically refers to the apparatus connected with the entrance or deposit of mail matter within the box and to the extracting mechanism whereby the mail matter is readily transferred from the box to a receiving pouch.

The mechanism assisting in entering the mail matter within the box constitutes a safety appliance adequately preventing any unauthorized extraction of the mail matter through the entrance channel provided for the same. Such mechanism is herein illustrated in connection with the box 10 which may be formed in any desired shape and herein constructed assuming the representation of a miniature house or building adapted to be secured to any stationary support such as the post 11 when operatively arranged and having a horizontal mail entrance slot 12 positioned through the front side or wall 13 of the box.

A rectangular frame 14 roughly representing a door is provided upon the front side 13 of the box providing panels 15 and 16 adapted to receive desirable printed matter such as notices regarding the times at which collections of mail take place from the said box.

A mechanical unit 17 of the form illustrated in Figs. 5, 6 and 7 of the drawings is fixedly retained within the box 10 in any desirable manner and provides a base 18 positioned within the rectangular bottom molding 19 of the box 10, a mail receiver or receptacle 20 being mounted upon the said base and having front and rear walls 21 and 22 respectively arranged spaced a considerable distance from the front wall 13 and rear wall 23 of the said box whereby the receptacle 20 is positioned substantially centrally therein.

A frame plate 24 is arranged forwardly in parallelism with the front wall 21 of the receptacle adapted for positioning in flat engagement with the inner face of the front wall 13 of the box 10 when the device is assembled, an entrance slot 25 being arranged in the said frame plate coinciding with the mail entrance slot 12 of the mail box.

A receiving slide or drawer 26 adapted to be projected outwardly through the slots 25 and 12 for the reception of mail matter and to carry the same inwardly for depositing within the receptacle 20 is arranged with end trunnions 27' slidably projecting through opposite horizontal slots 27 in the opposite ends 28 of the said receptacle and forward extensions 29 thereof connecting the receptacle with the said frame plate 24. Weighted sides or flanges 30 are provided for the drawer 26 whereby the latter is normally positioned vertically within the receptacle 20 as best illustrated in Figs. 5 and 9 of the drawings, the rear wall 22 of the receptacle having a forwardly curved upper portion 31 while the upper portion of the front receptacle wall 21 is cut-away adapted for the swinging and sliding movement of the said drawer. Anti-friction rollers 32 are oppositely carried by the receptacle ends 28 in contact with the bottom of the drawer 26 for assisting in supporting the latter during its sliding movement upon a leaf 33 inwardly extending from the receptacle side 21 and angular guides 34 arranged adjacent the said slots 27.

An operating shaft 35 is provided for the drawer 26 having arms 36 arranged adjacent its opposite ends connected by means of links 37 with operating levers 38 which are secured at their lower ends to a shaft 39 journaled to the rear side 22 of the receptacle 20 by means of brackets 40. A vertically movable block 41 is arranged adjacent the front wall 13 of the box having a reduced portion 42 slidably projecting through a slot 43 in the said wall and arranged with a slide plate 44 outwardly thereof upon which plate a finger engaging operating lever 45 projects. A rocker 46 is pivoted to the frame portion 47 of the unit being pivotally connected at one end with the block 41 by means of a link 48 having its other end pivotally connected by means of a link 49 with an arm 50 secured to the said shaft 35. Guide rods 75 are carried by the block 41 slidably arranged in vertical guide tubes or cylinders 76 carried by the adjacent edge of the frame 47. The upper ends of the levers 38 are pivotally connected to the drawer trunnions 27 by means of links 51. A double leaf spring 52 is carried by each of the links 51 being normally retracted when the drawer 26 is in its inoperative vertical position, the free ends of the springs 52 being pivotally connected to the adjacent ends of lugs 53 upon the trunnions 27' by means of links 54.

Separate return springs for the drawer 26 are arranged forwardly and rearwardly of the receptacle 20, the forward spring illustrated at 55 being positioned surrounding the shaft 35 with one end secured to an arm 56 upon the said shaft and its other end fixedly attached to a cross brace 57 horizontally positioned attached to the lower end of the frame plate 24. The rear spring 58 surrounds the shaft 39 having one end attached to an arm 59 carried thereby and with its other end resiliently contacting the adjacently positioned rear wall 22 of the receptacle 20.

It will be understood that by forcibly depressing the finger lever 45, the operating shaft 35 is rotated for shifting the levers 38 and moving the connecting links 51 longitudinally forwardly, which forces the drawer 26 forwardly with its trunnions 27' sliding in the said slots 27, the engagement of the rear portion of the drawer with the rollers 32 causing the drawer to assume a substantially horizontal position for sliding forwardly through the slots 25 and 12. Upon releasing the lever 45, the springs 55 and 58 impart a return revolution to the shafts 35 and 39 respectively, thereby shifting the drawer 26 with its contained mail matter rearwardly until the weighted flanges 30 assisted by the tensioned springs 52 tilt the rear end of the drawer 26 downwardly, depositing the mail matter within the receptacle 20.

A cover slide 60 is provided for the frame plate slot 12 being slidably arranged and flatly engaged with the rear face of the said plate and arranged with depending links 61 attached to the inner ends of levers 62 pivotally attached as at 63 adjacent the opposite edges of the front of the frame plate 24. A head 64 is slidably arranged with an upright guide member 65 positioned between the brace 57 and guides 34, a link 66 pivotally connecting the said head 64 with an arm 67 carried by the operating shaft 35 and whereby the head 64 is vertically reciprocated during the partial rotations of the shaft 35 in operating the drawer 26. An oppositely extending arm member 68 is carried by the head 64 having loose connections at its free ends with links 69 pivoted as at 70 to the rear face of the frame plate 24 while connecting links 71 are pivotally attached between the links 69 and the members 62. It will thus be understood that the downward movement of the finger lever 45 in forwardly moving the mail receiving drawer 26 to its open position projecting outwardly of the slots 25 and 12 as best illustrated in Fig. 10 of the drawings, forcibly lowers the head 64 and arm 68 therewith which acts upon the closure slide 60 through the agency of the levers 62 and pivotal connecting members so that the said slide 60 is retracted beneath the said slots in advance of the movement of the drawer 26 outwardly therethrough. The levers 62 extend approximately to the brace 57 when the slide 60 is in its lowermost position, the said shoulders 72 acting as stops for the controlling mechanism. The return rearward movement of the drawer 26 is accompanied by the return upward movement of the slide 60 which moves to its closed position inwardly of the slot 25 immediately after the slidable retraction of the drawer 26 inwardly therethrough. The drawer 26 is movable in the manner described from its vertical position as illustrated in Figs. 5 and 9 of the drawings to its horizontal position as shown in Fig. 10 thereof and at which times the inner ends or shoulders 72 formed at the forward ends of the flanges 30 of the drawer forcibly contact the portion of the front plate 24 above the slot 25 while mail matter is readily deposited within the forwardly projecting portion of the drawer, the forward end thereof being arranged with sides 73 and a central cut-away finger accommodating portion 74.

Opposite housings 78 are arranged upon the base 18 adjacent the ends of the receptacle 20, two oppositely positioned coöperating trap doors 79 being arranged for forming the outlet closure or bottom of the receptacle 20 and having side flanges 80 shiftably arranged within the said housing 78. Pivoting rods 81 are arranged for the bottom door 79, the latter forming a horizontal bottom for the receptacle when closed as best illustrated in Fig. 9 of the drawings, a flange 82 being carried by one of the said doors adapted for overlapping the adjacent free edge of the other door when closed.

Opposite receiving flanges or guide-ways 83 are carried beneath the opposite side edges of the base 18 arranged within the bottom molding 19 of the box 10, the said ways being open at their forward ends whereby a mail extractor 84 may be slidably inserted therein upon elevating the front section 85 of the molding 19 which section is connected by hinges 86 with the front wall 13 of the box.

Opposite operating rods 87 are arranged for the doors 79 being vertically slidably positioned within tubes 88 carried by the housings 78, the lower ends of the said rods 87 being pivotally attached to the doors 79 by means of links 89 whereby a downward movement of the rods 87 forces the doors 79 open, as best illustrated in Fig. 11 of the drawings. A cross head 90 is provided upon the upper free end of each of the rods 87 through which guide rods 91 are freely positioned, the said guide rods 91 being secured upright upon the housing 78 and having encircling springs 92 thereon arranged between the housings and cross heads 90 whereby the doors 79 are normally maintained in their closed relations.

Rocking levers 93 are pivoted as at 94 to the outer sides of the housings 78 and have their forward ends pivotally connected to the cross heads 90 by means of links 95 while the rear ends of the rocking levers 93 are pivotally attached by means of links 96 with operating blocks 97. The base 18 is arranged with opposite channels 98 in which the base portions 99 of the blocks 97 are slidably arranged, longitudinal projecting flanges 100 being carried by the said base portions, which flanges slidably project through opposite slots 101 longitudinally arranged in the sides of the said channels. It will be understood that the mail extractor 84 is provided with normally retracted projectible detents 102 adapted to project through bottom slots 103 of the channels 98 when the said detents are projected, the latter being then positioned rearwardly of the blocks 97, as best illustrated in Fig. 10 of the drawings whereby the rear movement of the extractor 84 forces the blocks 97 rearwardly effecting a downward movement of the links 95 for opening the doors 79.

The blocks 97 are normally restrained against rearward longitudinal movement by the arrangement of double locking members releasable only upon the insertion of the extractor 84 whereby the latter is only able to move the said blocks after the locking devices have been released. Latches 104 are provided for normally restraining the blocks 97 against movement being hinged as at 105 adjacent the rear ends of the outer opening channels 106 of the guide ways 83, an arm 107 being carried by each of the latches 104 projecting upwardly through slots 108 and normally maintained in contact with the outer side of the adjacent channel 98 and within the path of movement of the adjacent block flange 100 whereby the blocks 97 are prevented from rearward movement until the latch arms 107 are moved outwardly. A lug 109 is carried by each of the latches 104 projecting inwardly of the ways 83 through adjacent slots 110 whereby the lugs 109 are arranged within the path of movement of the side posts 111 of the extractor 84 for allowing the forward pointed ends 112 of the said post to engage the lugs 109 for outwardly moving the same and releasing the latch arms 107 from the block flanges 100.

The blocks 97 are arranged with keeper slides 113 having base portions 114 slidably arranged upon the sides of the channels 98. A supporting plate 115 is carried by the front ends of the housing 78 being provided with slots 116 adjacent its opposite ends adapted for the reception of tongues 117 carried by the slides 113 and arranged with the keeper openings 118 therethrough adapted for the reception of the reduced ends of locking bolts 119 slidably arranged upon the forward face of the supporting plate 115. The bolts 119 are arranged with central longitudinal slots 120 through which slots ribs 121 carried by the plate 115 are projected, pins 122 upon the said ribs retaining the bolts 119 slidably mounted thereon. Releasing levers 123 are arranged for the bolts 119 being substantially centrally pivoted as at 124 to the opposite sides of the base 18, the rear ends of the said levers normally overlying the arms 107 of the latches 104 and whereby the outward releasing movement of the arms 107 moves the levers 123 against the action of the springs 125 to force inwardly the connecting links 126 shifting the pivotal links 127 which connect the members 126 with the inner ends of connectors 128, the latter having their outer ends attached to ears 129 mounted upon the bolts 119. The engagement of the post ends 112 of the extractor 84 with the latch lugs 109 in this manner effects the releasing of the arms 107 as well as the bolts 119 from the blocks 97 permitting the detents 102 to rearwardly move the said blocks for opening the receptacle doors 79.

The arrangement of the extractor 84 is best illustrated in Sheet 7 of the drawings having a body-portion 130 carrying the aforementioned posts 111 at the opposite longitudinal sides thereof which posts are provided with a handle 131 at their rear ends by which the extractor may be readily carried and operated. The body 130 is provided with a rectangular opening 132 having a depending flange 133 surrounding the same adapted for attaching a mail pouch 134 thereto in any desired manner, such as by means of a top band 135 and whereby mail matter passed through the opening 132 may be passed into the pouch 134. A closure slide 136 is provided for the ejector opening 132, the same being maintained normally closed by means of springs 137 arranged within the aforementioned posts 111 and engaging marginal brackets 138 carried by the closure 136 and extending within the posts 111 through side slots 139.

Outwardly projecting plates 140 are carried by the brackets 138 slidably projecting outwardly through slots 141 to the outer sides of the posts 111. The aforementioned detents 102 are carried by hinged members 142 arranged adjacent the pointed ends of the posts 111 and having engaging springs 143 normally maintaining the detents 102 outwardly projecting through the adjacent slots 144 in the outer sides of the said posts. The brackets 138 are provided at their forward ends with curved wedging plates 145 adapted for normally engaging beneath the hinged members 142 retaining the detents 102 retracted but projectable by means of the springs 143 when the wedging portions 145 are released upon retracting the brackets 138.

It will be understood that the government official who collects the mail matter from the box 10 is provided with an extractor 84 to which a mail pouch 134 is removably secured, the latter being normally closed by means of the plate 136, the mail receptacle 20 being normally closed and it being desired to deposit the mail therefrom into the pouch 134. The official positions the extractor with the posts 111 thereof within the ways 83 and by means of the handle 131 forcibly slides the ejector inwardly beneath the base 18. The engagement of the pointed ends 112 of the ejector posts releases the latch arms 107 which in turn releases the bolts 119 whereby the blocks 97 are rendered free to move for opening the doors 79. The inward sliding movement of the extractor 84 in the manner mentioned engages the plates 140 with the forward sides of the ways 83 which allows the further inward movements of the ejector to allow the closure 136 to remain stationary whereby the passage 132 is open during the further inward movement of the extractor 84, such forward movement also releasing the wedge members 145 from the hinge members 142 allowing the detents 102 to be automatically projected by the springs 143 at points forwardly of the blocks 97. A further forward movement of the ejector 84 then rearwardly moves the blocks 97 and by means of the mechanism hereinbefore described, actuates the doors 79 to their open position. A removal of the extractor 84 allows the springs 92 to again close the doors 79 and forces the blocks 97 to their forward positions while the latches 104 being released, the springs 125 return the arms 107 rearwardly of the block flanges 100 and the bolts 119 into engagement with the keeper openings 118, the blocks 97 and doors 79 being normally locked against movement when the extractor 84 is removed from the box. This removal of the ejector 84 allows the springs 137 to close the plate 136 over the pouch 134 and also retracts the detents 102 by reëngaging the wedges 145 beneath the hinged members 142.

A serviceable mail box is thus arranged in which the mail matter is secure against any unauthorized tampering, a plurality of locking means being arranged for the closure doors thereof while the contents of the mail receptacle is easily and quickly discharged into a normally closed mail pouch whenever desired by the proper official.

What I claim as new is:—

1. A device of the class described comprising a mail box having a mail entrance slot, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, and means for causing the vertical mail-receiving drawer to assume a horizontal position previous to the outwardly sliding projection thereof.

2. A device of the class described comprising a mail box having a mail entrance slot, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, a finger lever vertically movable adjacent the front wall of the box, and operative connections between the said lever and drawer, whereby the vertical mail-receiving drawer is caused to assume a horizontal position previous to the outwardly sliding projection thereof.

3. A device of the class described comprising a mail box having a mail entrance slot, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, and automatic retracting and dumping means for the said drawer adapted to cause the vertical mail-receiving drawer to assume a horizontal position previous to the outwardly sliding projection thereof.

4. A device of the class described comprising a mail box having a mail entrance slot, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, a finger lever vertically movable adjacent the front wall of the box, operative connections between the said lever and drawer, whereby the vertical mail-receiving drawer is caused to assume a horizontal position previous to the outwardly sliding projection thereof, and automatic retracting and dumping means for the said drawer.

5. A device of the class described comprising a mail box having a mail entrance slot, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, a vertically movable closure slide for the said slot, and operating means for the said slide operable simultaneously with the movement of the drawer from vertical to horizontal position whereby the said slide is in its open position when the drawer is arranged within the slot.

6. A device of the class described comprising a mail box having a mail entrance slot, a closure slide therefor, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, a finger lever vertically movable adjacent the front wall of the box, operative connections between the said lever and drawer, whereby the vertical mail-receiving drawer is caused to assume a horizontal position previous to the outwardly sliding projection thereof, and operating means for the said closure slide operable simultaneously with the actuation of the said drawer whereby the said slide is in its open position when the drawer is arranged within the slot.

7. A device of the class described comprising a mail box having a mail entrance slot, a closure slide therefor, an upright receptacle substantially centrally arranged within the said box, a normally vertically arranged mail receiving drawer bodily pivoted in the said receptacle at a point spaced from the front wall and being forwardly sildable through the said slot with a portion thereof projecting forwardly of the box, a horizontal platform and roller bearing over which the drawer is adapted to slide, automatic retracting and dumping means for the said drawer adapted to cause the vertical mail-receiving drawer to assume a horizontal position previous to the outwardly sliding projection thereof, and operating means for the said closure slide operable simultaneously with the actuation of the said drawer whereby the said slide is in its open position when the drawer is arranged within the slot.

8. A device of the class described comprising a mail box having a mail entrance slot, a closure slide therefor, an upright receptacle substantially centrally arranged within the said box, a normally vertically arranged mail receiving drawer bodily pivoted in the said receptacle at a point spaced from the front wall and being forwardly slidable through the said slot with a portion thereof projecting forwardly of the box, a horizontal platform and roller bearing over which the drawer is adapted to slide, a finger lever vertically movable adjacent the front wall of the box, operative connections between the said lever and drawer whereby the vertical mail-receiving drawer is caused to assume a horizontal position previous to the outwardly sliding projection thereof, automatic retracting and dumping means for the said drawer, and operating means for the said closure slide operable simultaneously with the actuation of the said drawer whereby the said slide is in its open position when the drawer is arranged within the slot.

9. A device of the class described comprising a mail box having an entrance slot therein, a mail receptacle within the said box, a normally vertically arranged receiving drawer bodily pivoted within the upper open end of the said receptacle at a point spaced from the front wall, forward moving and horizontal positioning means for the said drawer, the horizontal positioning occurring previous to the forward movement thereof, the drawer extending outwardly of the said slot when in its operative projected position, and a horizontal platform and roller bearing over which the drawer is adapted to slide.

10. A device of the class described comprising a mail box having an entrance slot therein, a mail receptacle within the said box, a normally vertically arranged receiving drawer bodily pivoted within the upper open end of the said receptacle at a point spaced from the front wall, forward moving and horizontal positioning means for the said drawer, the horizontal positioning occurring previous to the forward movement thereof, the drawer extending outwardly of the said slot when in its operative projected position, and a horizontal platform and roller bearing over which the drawer is adapted to slide, a vertically movable closure slide for the said slot normally arranged in its closed position when the drawer is retracted, and operating means for the said slide simultaneously actuated during the movements of the said drawer.

11. A mail box having a receiving slot, a receptacle within the said box having an open upper portion inwardly of the said slot, a mail receiving drawer bodily shiftably and slidably trunnioned within the said receptacle normally arranged vertically therein adapted to be initially horizontally positioned and subsequently outwardly projected through the said slot when in its operative mail receiving position and a horizontal platform and roller bearing over which the drawer is adapted to slide.

12. A mail box having a receiving slot, a receptacle within the said box having an open upper portion inwardly of the said slot, a mail receiving drawer bodily shiftably and slidably trunnioned within the said receptacle normally arranged vertically therein adapted to be initially horizontally positioned and subsequently outwardly projected through the said slot when in its operative mail receiving position, and a horizontal platform and roller bearing over which the drawer is adapted to slide, means adapted for slidably moving the said drawer, and combined weight and spring means adapted to return the latter to its normal vertical dumping position.

13. A mail box having a receiving slot, a receptacle within the said box having an open upper portion inwardly of the said slot, a mail receiving drawer bodily shiftably and slidably trunnioned within the said receptacle normally arranged vertically therein adapted to be initially horizontally positioned and subsequently outwardly projected through the said slot when in its operative mail receiving position, and a horizontal platform and roller bearing over which the drawer is adapted to slide, a closure slide for the said slot vertically shiftable adjacent thereto, the said slide being downwardly retractable during the forward projecting movement of the drawer, and upwardly movable to closed position during the inward depositing movement of the latter.

14. A mail box having a receiving slot, a receptacle within the said box having an open upper portion inwardly of the said slot, a mail receiving drawer bodily shiftably and slidably trunnioned within the said receptacle normally arranged vertically therein adapted to be initially horizontally positioned and subsequently outwardly projected through the said slot when in its operative mail receiving position, and a horizontal platform and roller bearing over which the drawer is adapted to slide, means adapted for slidably moving the said drawer, combined weight and spring means adapted to return the latter to its normal vertical dumping position, a closure slide for the said slot vertically shiftable adjacent thereto, the said slide being downwardly retractable during the forward projecting movement of the drawer, and upwardly movable to closed position during the inward depositing movement of the latter.

15. A device of the class described comprising a box having a mail entrance slot therein, a receptacle substantially centrally arranged within said box having a forwardly extending portion provided with opposite slots, a drawer having trunnions slidably and revolubly arranged within the said receptacle slots, the said drawer being normally vertically arranged within the said receptacle and horizontally positioned projecting outwardly of the said receiving slot when in its projected operative position, an operating shaft for the said drawer, an operating lever positioned forwardly of the said box, operative connections between the said lever and shaft, operative connections between the said drawer trunnions and shaft adapted for vertically moving the said drawer upon the downward movement of the said lever, return springs for the said shaft and drawer, a vertically movable closure slide for the said receiving slot, a vertically movable head arranged adjacent the said slide, operative link connections between the said head and slide, and operative connections between the said head and shaft.

16. A device of the class described comprising a box having a mail entrance slot therein, a receptacle substantially centrally arranged within said box having a forwardly extending portion provided with opposite slots, a drawer having trunnions slidably and revolubly arranged within the said receptacle slots, the said drawer being normally vertically arranged within the said receptacle and horizontally positioned projecting outwardly of the said receiving slot when in its projected operative position, an operating shaft for the said drawer, an operating lever positioned forwardly of the said box, operative connections between the said drawer trunnions and shaft adapted for vertically moving the said drawer upon the downward movement of the said lever, return springs for the said shaft and drawer, weighted rear flanges upon the said drawer, arms upon the said trunnions, dumping springs for the said drawer operatively attached to the said arms automatically tensioned during the forward opening movement of the said drawer, a vertically movable closure slide for the said receiving slot, a vertically movable head arranged adjacent the said slide, operative link connections between the said head and slide, and operative connections between the said head and shaft.

In testimony whereof I affix my signature.

ANDY SMITH.

Copies of this patent may be obtained for five cents each, by addressing the "Commissioner of Patents, Washington, D. C."